United States Patent [19]

Nohda

[11] 4,033,696
[45] July 5, 1977

[54] LENS METER

[75] Inventor: Masao Nohda, Kawasaki, Japan

[73] Assignee: Nippon Kogaku K.K., Tokyo, Japan

[22] Filed: Feb. 3, 1975

[21] Appl. No.: 546,750

[52] U.S. Cl. .............................. 356/126; 356/127
[51] Int. Cl.² .......................................... G01B 9/00
[58] Field of Search ................... 356/125, 126, 127

[56] References Cited

UNITED STATES PATENTS

| 1,873,526 | 8/1932 | Allen | 356/127 |
| 3,323,417 | 6/1967 | Grey et al. | 356/125 |

OTHER PUBLICATIONS

Bruning et al.; "A Versatile Laser Interferometer" Applied Optics vol. 9, No. 9, Sept. 1970, pp. 2180–2182.

Primary Examiner—John K. Corbin
Assistant Examiner—Conrad Clark
Attorney, Agent, or Firm—Fitzpatrick, Cella, Harper & Scinto

[57] ABSTRACT

A lens meter includes a target, a collimator lens system for forming an image of the target, a member having a reflecting surface facing the collimator lens system, and an indicating plate disposed at the focal point of the collimator lens system, and at a side opposite to the reflecting member relative to collimator lens system. The reflecting member is placed on the optical axis of the collimator lens system at a side opposite to the target relative to the collimator lens system. The reflecting member is movable along the optical axis and the target is placed at the focal point of the collimator lens system. The lens meter may further include a beam splitter for dividing the optical axes into two optical axes. In this case, the target is placed on one of the divided axes and the indicating member is placed on the other divided axis. Further improvement may be attained by providing in a suitable arrangement two polarizing plates and a quarter-wave plate.

5 Claims, 8 Drawing Figures

LENS METER

BACKGROUND OF THE INVENTION

1. Field of the Invention

This invention relates to a high precision lens meter.

2. Description of the Prior Art

Conventional lens meters have limited capabilities in respect of precision of measurement due to the depth of focus of a lens. Consequently, a substantial amount of operating skill is required to effect precise measurement.

SUMMARY OF THE INVENTION

The principal object of this invention is to provide a lens meter having a degree of precision twice as high as the degree of precision in conventional lens meters.

The second object of this invention is to provide a lens meter which is simple in operation to effect the measurement.

The third object of this invention is to provide a lens meter which prevents the degradation of measuring precision due to ghosts.

This invention presents a lens meter comprising a target; a collimator lens system for forming an image of the target; a reflecting member having its reflecting surface facing the collimator lens system; the reflecting member being disposed on the optical axis of the collimator lens at a side opposite to the target in relation to the collimator lens, and the reflecting member being movable along the optical axis of the collimator lens system, and the target being disposed at the focal point of the collimator lens system; and an indicating member disposed at the focal point of the collimator lens system and at a side opposite to the reflecting member relative to the collimator lens.

The above mentioned objects and other objects and features will be more apparent from the following description in conjunction with the drawing.

DESCRIPTION OF THE PREFERRED EMBODIMENTS

Figure 1:
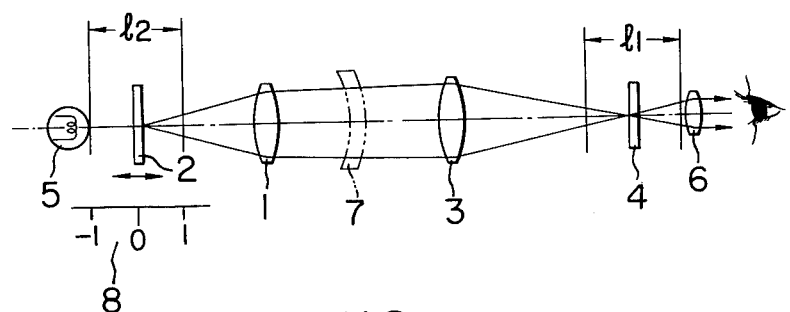
FIG. 1 shows an arrengement of a conventional lens meter.

For facilitating the understanding of this invention, the explanation shall be given firstly to a conventional telescopic lens meter shown in FIG. 1.

In FIG. 1, at the focal point of a collimator lens 1 a target 2 is placed slidably along the optical axis of the collimator lens. An indicating plate 4 is located at the focal point of the collimator lens 3. The target 2 is illuminated by a light source 5 so as to focus the image of the target 2 on the indicating plate 4 by the collimator lens system 1 and 3. The image thus focussed is observed through an eye-piece 6.

Next, the method of measuring the diopter of a lens is explained.

When the lens 7 to be investigated is placed in such a manner that the apex of the lens surface thereof accords with the optical axis of the collimator lens and locates at the focal point of the collimator lens 1, the image of the target 2 shifts from the indicating plate 4 in the direction of the optical axis so that the image on the indicating plate 4 becomes blurred. Consequently, the target 2 is moved along the optical axis so as to focus the image again on the indicating plate 4.

It is noted here that there is the relation of $Z = f^2 D$, where $f$ is the focal length of the collimator lens 1, D (Diopter) is the apex refracting power of the lens 7, and Z is the amount of the movement of the target 2.

Consequently, by measuring the amount Z of the movement of the target 2, the apex refracting power D of the lens 7 can be calculated. For this purpose, a scale plate 8 for reading out the position of the target 2 is provided. The scale is expressed in Diopter units and is adjusted to assign 0 for the position of the target 2 where this is located at the focal point of the collimator lens 1. Then by reading the position of the target 2 from the scale plate 8, the Diopter of the lens 7 to be detected is directly obtained.

However, if the collimator lens system 1 and 3 has the depth $l_1$ of the focus and the depth $l_2$ of the field, and target 2 is located at any position within the depth $l_2$ of the field, an observer can see quite clearly the image of the target 2 on the indicating member 4 as if the image were focussed on the indicating member 4. Therefore, for example, if the depth $l_2$ of the field corresponds to two graduations as shown in FIG. 1, this lens meter should have an error of measurement of ±1 Diopter.

Now the explanation will be made of the present invention.

Figure 2:
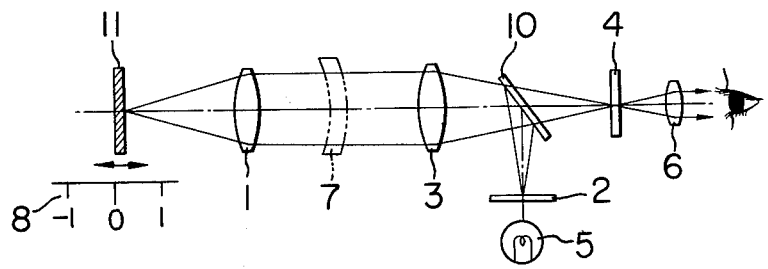
FIG. 2 shows an arrangement of the first embodiment according to this invention.
Figure 3A:
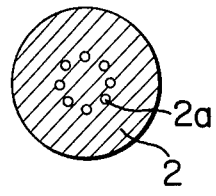
FIGS. 3A and 3B are front views of the target used in FIG. 2, FIG. 4 shown a front view of a part of the first embodiment.
Figure 4:
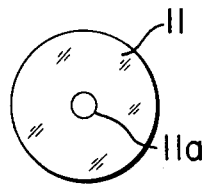

In FIG. 2, which shows the first embodiment of this invention, the target 2, the front view thereof being shown in FIG. 3A, is fixed in the direction of the optical axis of the collimator lens system 13 and located at the focal point of the collimator lens 3 through a beam splitter 10 such as a semitransparent mirror. As shown in FIG. 4, a mirror 11 having the pin hole 11a at its center is disposed at the left side of the collimator lens 1, as viewed, and is movable along the optical axis and the pin hole 11a coincides with the optical axis. Other elements of the system are substantially the same as that of FIG. 1. Consequently, when the mirror 11 locates at the focal point of the collimator lens 1, the image of the target 2 is focussed on the mirror 11 through the beam splitter 10 and the collimator lens system 1 and 3. The focussed image is reflected by the mirror 11 and is focussed on the indicating plate 4 after passing through the collimator lens system 1, 3 and the beam splitter 10.

In this state, when the lens 7 to be investigated is inserted at the position of the focal point of the collimator lens 1, the image of the target 2 is focussed neither on the mirror 11 nor on the indicating plate 4, so that an observer can see a blurred image. Then the mirror 11 is moved in the direction of the optical axis so as to focus the image of the target 2 on the mirror 11, and in turn on the indicating plate 4 and an observer can see the image most clearly. This amount of movement of the mirror 11 is read from the scale plate 8 to determine the value of Diopter of the lens 7.

Figure 5:
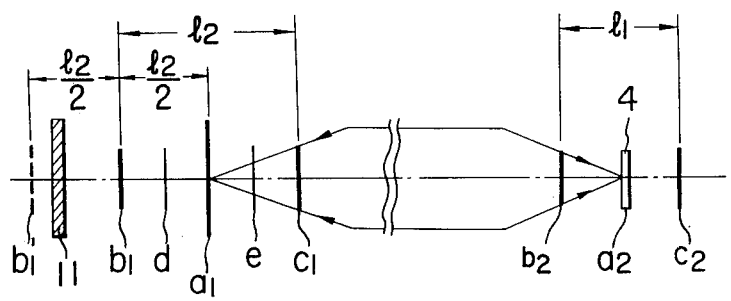
FIG. 5 is a drawing illustrating the principal of the first embodiment.

In the above explained measurement, it is assumed that the collimator lens system 1 and 3 has the depth $l1$ of the focus and the depth $l2$ of the field. As shown in FIG. 5, when the image of the target is focussed at the position $a1$ and the mirror 11 is moved in the right hand direction to locate at the position $b1$, which is the foundary of the range of the depth of field, the image of the target 2 at the position $a1$ is reflected by the mirror 11 at the position of $b1$, and the position of the image focussed by the collimator lens system 1, 3 and the lens 7 is outside of the range $l1$, of the depth of focus, in other words, at the left side of the position $b2$. Because, the virtual image of the target formed by the mirror 11 is located at the position $b1'$ at the left side of the position $b1$ departed from the position $b1$ by the distance of $(l2/2)$ so that the focussed position at the side of the indicating member will accord with the focussed position of the image of the target formed by the collimator lens system and so on in case the image of the target locates at said position $b'1$. Consequently, even if the mirror 11 locates at the position $b1$, an observer can understand that the image of the target is not on the mirror 11 as the image on the indicating member 4 is blurred. When the mirror 11 is moved further to the right to arrive at the intermediate point $d$ between the positions $a1$ and $b1$, the virtual image formed by the mirror 11 comes to the position $b1$, so that the focussed position of the image of the target 2 formed by the collimator lens system and so on at the side of indicating plate 4 locates at the position $b2$ within the depth $l1$ of the focus. Therefore, the clear image can be seen on the indicating plate 4. During further movement of the mirror 11 to the intermediate position $e$ between the positions $a1$ and $c1$, the clear image can continuously be formed on the indicating plate 4. Of course, if the mirror is further moved beyond the position $e$, no clear image can be obtained.

As apparent from the foregoing description, according to the described embodiment, only when the mirror 11 is moved within the range from the position $d$ to the position $e$, which is one half of the depth $l2$ of the field of the collimator lens system 1 and 3, a clear image can be seen on the indicating plate 4 so that the degree of precision of the measurement becomes twice as high as obtainable by the conventional lens meter. In other words, the lens meter of said embodiment has an error of ±0.5 Diopter.

Figure 6:
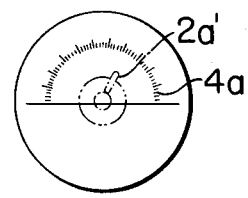
FIG. 6 shows a front view of the indicating member.

As mentioned, the center of the annulus of the hole $2a$ of the target 2 coincides with the optical axis, and therefore when the apex of the lens 7 coincides with the optical axis, the image of the annulus is formed at the centre of the indicating plate 4(FIG. 6). However, if the apex of the lens 7 deviates from the optical axis, in the conventional lens meter, the image of the hole $2a$, i.e., the image of the target, disappears from the visual field or partially appears in the visual field so that an observer should have to move the image of the target within the visual field and specifically, in case of detecting for example, astigmatism, to move the image of the target at the center of the indicating plate.

In the present invention, the light rays from the target pass the lens 7 two times, so that the image of the target always appears at the centre of the indicating plate 4 even if the apex of the lens 7 deviates from the optical axis of the collimator lens system, which simplifies the operation.

Furthermore, the astigmatism of the lens 7 can be judged due to the fact that, in case of the astigmatism, the image $2a'$ of the hole $2a$ of the target 2 appears on the indicating plate 4, of which the front view is shown in FIG. 6, in the shape of a rod. In FIG. 6, only one image of the hole is shown for avoiding complexity of the drawing. The direction of the astigmatism can be determined by measuring the orientation of the long axis of the rod-like image $2a'$ with the aid of the angular scale $4a$ provided on the indicating plate. For this purpose, it is necessary to locate the image of the target 2 at the center of the indicating plate 4. However, as mentioned before, in accordance with this invention, since the image of the target 2 comes to the center of the indicating plate 4 even though the apex of the lens 7 does not coincide with the optical axis, the operation is quite easy.

Further, the degree of the deformation of the image of the target to a rod-like image corresponds to the degree of the astigmatism. For example, when the degree of the astigmatism is around 0.125 Diopter, the degree of the deformation is very small so that it is quite difficult to measure it by the conventional lens meter. However, according to the present invention, since the light rays coming from the target 2 pass two times the lens 7 to be detected, the degree of the deformation becomes twice as large as that in case of the conventional lens meter, so that the measurement becomes much easier than with the conventional lens meter not only in the measurement of the degree of deformation but also of the orientation of the axis of the astigmatism.

Figure 3B:
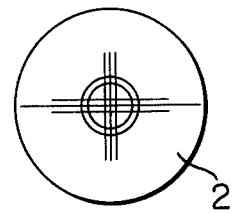

In cases where the target 2, shown in FIG. 3B, is used for measuring the orientation of the axis of astigmatism by the conventional lens meter, it is necessary to rotate the target. Therefore, the conventional lens meter requires provision of a mechanism both to move the target in the direction of the optical axis and to rotate the target. This mechanism is complicated and difficult to manufacture so that it is difficult to improve the precision in measurement. On the other hand, according to the present invention, it is only necessary to rotate the target so that this difficulty in the conventional lens meter is eliminated. To make the apex of the lens 7 coincide with the optical axis, of the collimator, it is only necessary to move the lens 7 in the direction perpendicular to the optical axis so as to locate the image of the pin hole $11a$ of the mirror 11 at the center of the indicating plate 4.

Figure 7:
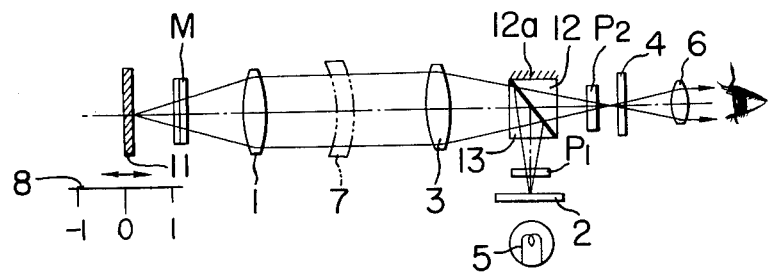
FIG. 7 shows an arrangement of the second embodiment of this invention.

Next, the second embodiment of this invention will be explained referring to FIG. 7. In the second embodiment, the following improvement has been attained. The beam splitter 10 in the first embodiment consists in the second embodiment of two prisms 12 and 13, and a polarizing plate P1 is disposed between the beam splitter 12, 13 and the target 2. The polarizing plate P1 forms the light from the target 2 into linear polarized light. Between the collimator lens 1 and the mirror 11, a quarter-wave plate M is disposed and between the beam splitter 12, 13 and the indicating plte 4 is disposed a second polarizing plate P2 having the plane of polarization perpendicular to that of the first polarizing plate P1.

By the above mentioned arrangement, the light coming from the target 2 becomes a linear polarized light by means of the polarizing plte P1. The linear polarized light is reflected by the beam splitter 12, 13 and enters the collimator lens system 1, 3 and the lens 7 to be detected. The linear polarized light reflected by the surfaces of the beam splitter 12, 13, collimator lens system 1, 3 and the lens 7 and directed to the indicating plate 4 is intercepted by the second polarizing plate P2 so that the reflected light does not produce a ghost on the indicating plate 4. The linear polarized light passing through the collimator lens 1 becomes a circularly polarized light by the quarter-wave plate M and the circularly polarized light enters the mirror 11 to focus there an image of the target 2. The light impinged on the mirror 11 is reflected by the mirror 11 and becomes a linear polarized light again by the quarter-wave plate M, but the plane of polarization of this linear polarized light is coincident with the plane of polarization of the polarizing plate P2 so that the linear polarized light is focussed on the indicating plate 4 penetrating the collimator lens system 1, 3, lens 7, beam splitter 12, 13 and the polarizing plate P2.

A part of the reflected light coming from the mirror 11 and passing the quarter-wave plate M is reflected by the surfaces of the collimator lens system 1, 3 and the lens 7 and enters again the mirror 11 and is reflected again by the mirror 11 to pass the quarter-wave plate M. However, the plane of polarization of this light ray passing the quarter-wave plate M is perpendicular to that of the polarizing plate P2 so that it is intercepted by the polarizing plate P2. Consequently, in accordance with the second embodiment, only the light rays reflected one time by the mirror 11 arrive at the indicating plate 4 and all of the other undesired reflected light rays are intercepted so that no ghost, which deteriorates the image, appears on the indicating plate.

Further, by making the upper surface of the prism 12 as a mat surface 12a, the linear polarized light rays which pass the semitransparent surface of the beam splitter are diffused by the mat surface 12a. Then the light rays reflected by the mat surface become non-polarized light rays so that the reflected light rays are reflected further by the beam splitter 12, 13 to illuminate the indicating plate 4 after transmission through the second polarizing plate P2, which would make the scale etc. on the indicating plate 4 easy to see.

It is to be noted that the above explained two embodiments are related with the telescopic lens meter, and the present invention is applicable to the projection type lens meter.

I claim:
1. A lens meter comprising:
   a collimator lens system in which the lens to be detected is located;
   a beam splitter for dividing the optical axis of said lens system into two optical axes;
   a target disposed on one of said two axes and at the focal plane of said lens system;
   an indicating member on the other of said two axes and at the focal plane of said lens system; and
   a reflecting member disposed on the opposite side of said lens system from said target to reflect the light beam passed through the lens system from said target toward said lens system, said reflecting member being movable along the optical axis of said lens system to enable said lens system to focus the reflected light beam on said indicating member and being provided with a marking on its reflecting surface; whereby, the light beam from said marking passes through said collimator lens system and the lens to be detected once only and then reaches said indicating member, and movement of the lens to be detected in the direction perpendicular to the axis of said collimator lens system causes the image of said marking on said indicating member to be moved thereby to permit detection of th apex of the lens to be detected.

2. A lens meter according to claim 1, wherein said marking is in alignment with the optical axis of said lens system.

3. A lens meter according to claim 1, further comprising a first polarizing plate disposed in the light path between the target and the beam splitter;
   a quarter-wave plate disposed in the light path between the collimator lens system and the reflecting member; and
   a second polarizing plate disposed in the light path between the indicating member and the beam splitter, the planes of polarization of the first and second polarizing plates being perpendicular to each other.

4. A lens meter according to claim 3, wherein said beam splitter is a semi-transparent mirror which reflects part of the light beam from said target toward said lens system and transmits part of the reflected light beam to said indicating member, and further comprising a member including a mat surface disposed on the opposite side of the semi-transparent mirror from said target for diffusing the light beam passed through the semi-transparent mirror from said target.

5. A lens meter according to claim 3, wherein said beam splitter includes two prisms contacting each other, whose contacting surfaces function as a semi-transparent mirror which reflects part of the light beam from said target toward said lens system and transmits part of the reflected light beam to said indicating member and whose one surface is formed as a mat surface to diffuse the light beam arriving thereon.

* * * * *